United States Patent
Arnould et al.

(10) Patent No.: US 6,318,250 B1
(45) Date of Patent: Nov. 20, 2001

(54) DEVICE FOR ACTUATING THE CLUTCH OF A TWINE WRAP DEVICE FOR BALERS

(75) Inventors: Cyrille Arnould, Montoy-Flanville (FR); Ansgar Nonhoff, Wallerfangen (DE); Denis Mesmer, Bouzonville (FR)

(73) Assignee: Usines Claas France, Metz (FR)

( * ) Notice: Subject to any disclaimer, the term of this patent is extended or adjusted under 35 U.S.C. 154(b) by 0 days.

(21) Appl. No.: 09/434,538

(22) Filed: Nov. 5, 1999

(30) Foreign Application Priority Data

Nov. 5, 1998 (DE) .............................................. 198 51 021

(51) Int. Cl.⁷ .......................... A01F 15/14; B30B 15/12; B65B 13/26
(52) U.S. Cl. .................................. 100/4; 56/343; 192/28
(58) Field of Search ............................. 100/4, 17–24; 56/343; 289/2; 192/28

(56) References Cited

U.S. PATENT DOCUMENTS

| | | | |
|---|---|---|---|
| 2,560,143 | * 7/1951 | Vietti ........................................ | 100/4 |
| 2,633,794 | * 4/1953 | Rothrock ................................... | 100/4 |
| 2,636,582 | * 4/1953 | Harrington et al. .................... | 100/20 |
| 2,713,303 | * 7/1955 | Hill .......................................... | 100/4 |
| 2,746,584 | * 5/1956 | Skromme ................................. | 100/4 |
| 4,083,441 | 4/1978 | Young . | |
| 4,095,520 | * 6/1978 | Burford ................................... | 100/4 |
| 4,522,120 | 6/1985 | Olfert . | |
| 4,569,282 | 2/1986 | Galant . | |
| 4,838,015 | 6/1989 | Mouret et al. . | |
| 5,783,816 | 7/1998 | McPherson . | |
| 5,855,166 | * 1/1999 | McPherson ............................. | 100/4 |

FOREIGN PATENT DOCUMENTS

| | | |
|---|---|---|
| PS 5 94 733 | 3/1934 | (DE) . |
| PS 7 67 505 | 11/1952 | (DE) . |
| 27 38 500 | 3/1978 | (DE) . |
| 0 573 342 B1 | 7/1997 | (EP) . |
| 3-139208-A | * 6/1991 | (JP) . |
| 3-155705-A | * 7/1991 | (JP) . |

* cited by examiner

Primary Examiner—Stephen F. Gerrity
(74) Attorney, Agent, or Firm—Husch & Eppenberger, LLC; Robert E. Muir; Dutro E. Campbell, II

(57) ABSTRACT

A device for actuating the clutch of a twine wrap device in a big square baler for harvested crops has a pawl attached to the clutch, a shift lever pivotable into the orbit of the pawl, a control device for the shift lever, and an electric motor which is drive-connected with the control device for the shift lever. The electric motor may be connected via an electric circuit with a device for determining the bale length.

25 Claims, 4 Drawing Sheets

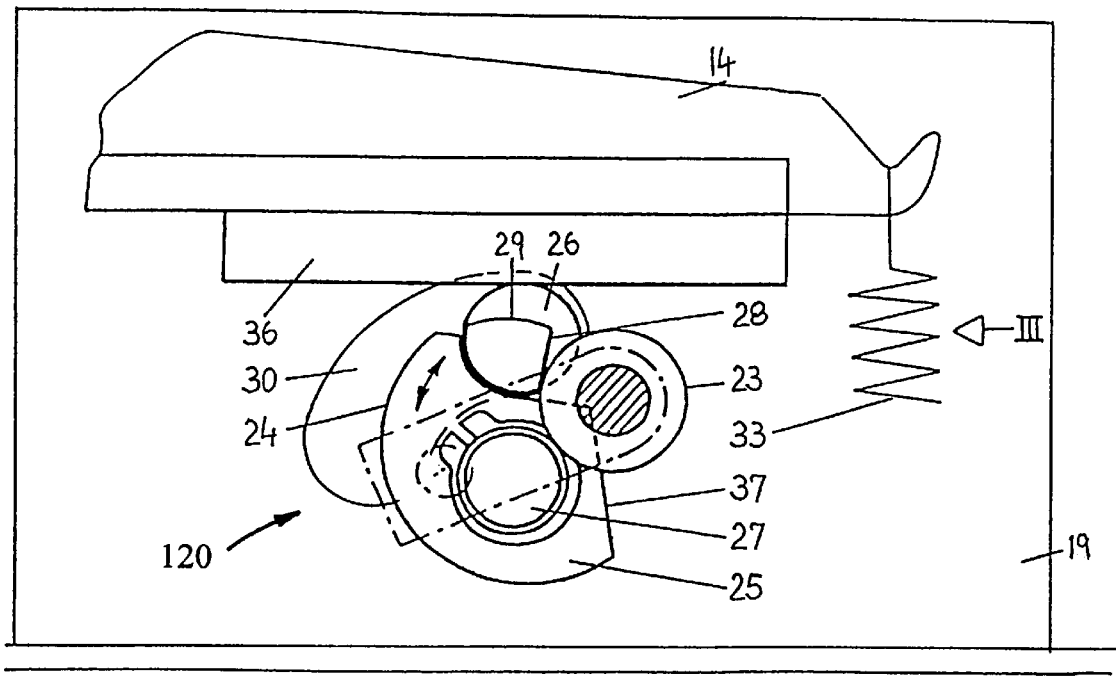
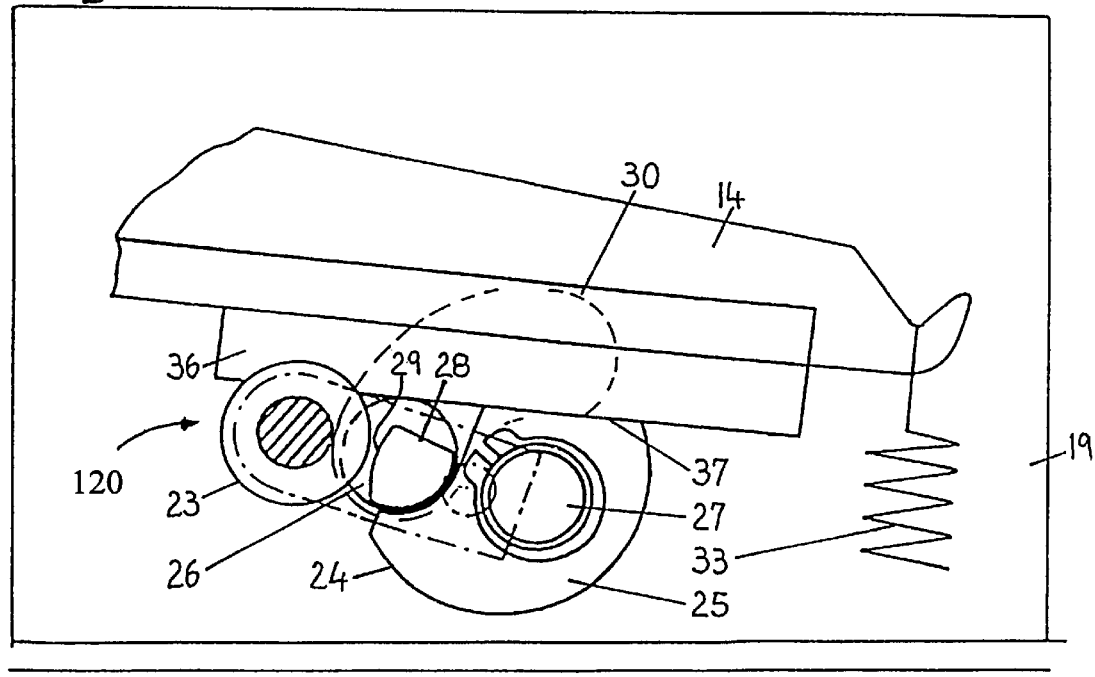

DEVICE FOR ACTUATING THE CLUTCH OF A TWINE WRAP DEVICE FOR BALERS

FIELD OF THE INVENTION

The present invention relates generally to agricultural machinery and, more particularly, to a device for actuating the clutch of a twine wrap device for balers and especially for big square balers.

BACKGROUND OF THE INVENTION

Applicant is aware of the following patents and publications, the disclosures of which are incorporated by reference herein:

| | |
|---|---|
| U.S. Pat. No. 4,083,441 | U.S. Pat. No. 4,522,120 |
| U.S. Pat. No. 4,569,282 | U.S. Pat. No. 4,838,015 |
| U.S. Pat. No. 5,783,816 | EP 0,573,342 |

A mechanical twine wrapping device is known from U.S. Pat. No. 4,083,441 (DE 27 38 500). In this design, the bale length is determined by a rotatable star wheel. The rotary movement of the star wheel is transmitted by a toothed segment and a connecting lever to a pivotably mounted stop in the clutch region. As soon as the pre-selected bale length is reached, the actuation of the clutch is controlled by the stop, and the process of twine wrapping the bale is triggered. Sufficient reliability of operation is achieved in balers of small and medium capacities with this design. However, as a result of higher pressing capacities and working speeds, such a design does not provide reliable and trouble-free operation under all the conditions, particularly in the conditions which occur in big square balers.

Electrical actuating devices for the clutch of the twine wrap device, such as those on big square balers, have also been developed. For example, from EP 0 573 342, a baler is known on which the twine wrap device is controlled by a star wheel, which determines the bale length, in conjunction with an electrical sensor. When the bale reaches a specified length, the sensor sends a signal to a control device which emits a control signal to the device for triggering the twine wrapping process. The triggering device is comprised of a lifting magnet, which is actuated by the control signal, and a clutch. When the lifting magnet is actuated, the clutch is switched by the lifting motion of the lifting magnet's ram. However, voltage fluctuations within the electrical wiring of the baler can prevent the lifting magnet from exerting a sufficient force to trigger the clutch, and may lead to malfunctions during the twine wrapping process.

SUMMARY OF THE INVENTION

The present invention provides a reliable actuating device for the clutch of a twine wrap device, for example, that of a big square baler as described herein, or other machines using wrapped twine fasteners. In accordance with one aspect of the present invention, there is provided a device for actuating the clutch of a twine wrap device using a pawl attached to the clutch, a shift lever is pivotable into the orbit of the pawl, a control device activates the shift lever, and an electric motor cooperates with the control device for the shift lever. The electric motor may be connected via an electric circuit with a device for determining the bale length in a baler. The electromotive control of the clutch according to the present invention requires a relatively low power level and may be independent of the particular vehicle voltage, as a result, the reliability of the clutch triggering process at the required point in time is improved.

It is an object of this invention to provide a twine wrapping device for balers having an improved clutch mechanism.

It is an object of this invention to provide a twine wrapping device for balers having an electromotive controlled clutch.

It is an object of this invention to provide a clutch mechanism for a twine wrapping device having a control mechanism actuated by an electric motor.

It is a further object of this invention to provide a twine wrapping device for big square balers having a clutch mechanism with an improved clutch actuating device.

These and other objects, aspects, features and advantages of the present invention will become apparent from the following detailed description when taken in conjunction with the referenced drawings. The drawings illustrate the best presently known mode of carrying out the invention and use similar reference characters to indicate the same parts throughout the views.

BRIEF DESCRIPTION OF THE DRAWINGS

FIG. 2a is the actuating device for the clutch with the shift lever outside the orbit of the pawl (clutch engaged).

FIG. 2b is the actuating device for the clutch with the shift lever outside the orbit of the pawl, the pawl being located in the lower position (clutch engaged).

FIG. 5 is the control device in section V—V of FIG. 4.

FIG. 6 is the control device in a sectional view according to FIG. 2a.

DESCRIPTION OF THE PREFERRED EMBODIMENTS

Figure 1:
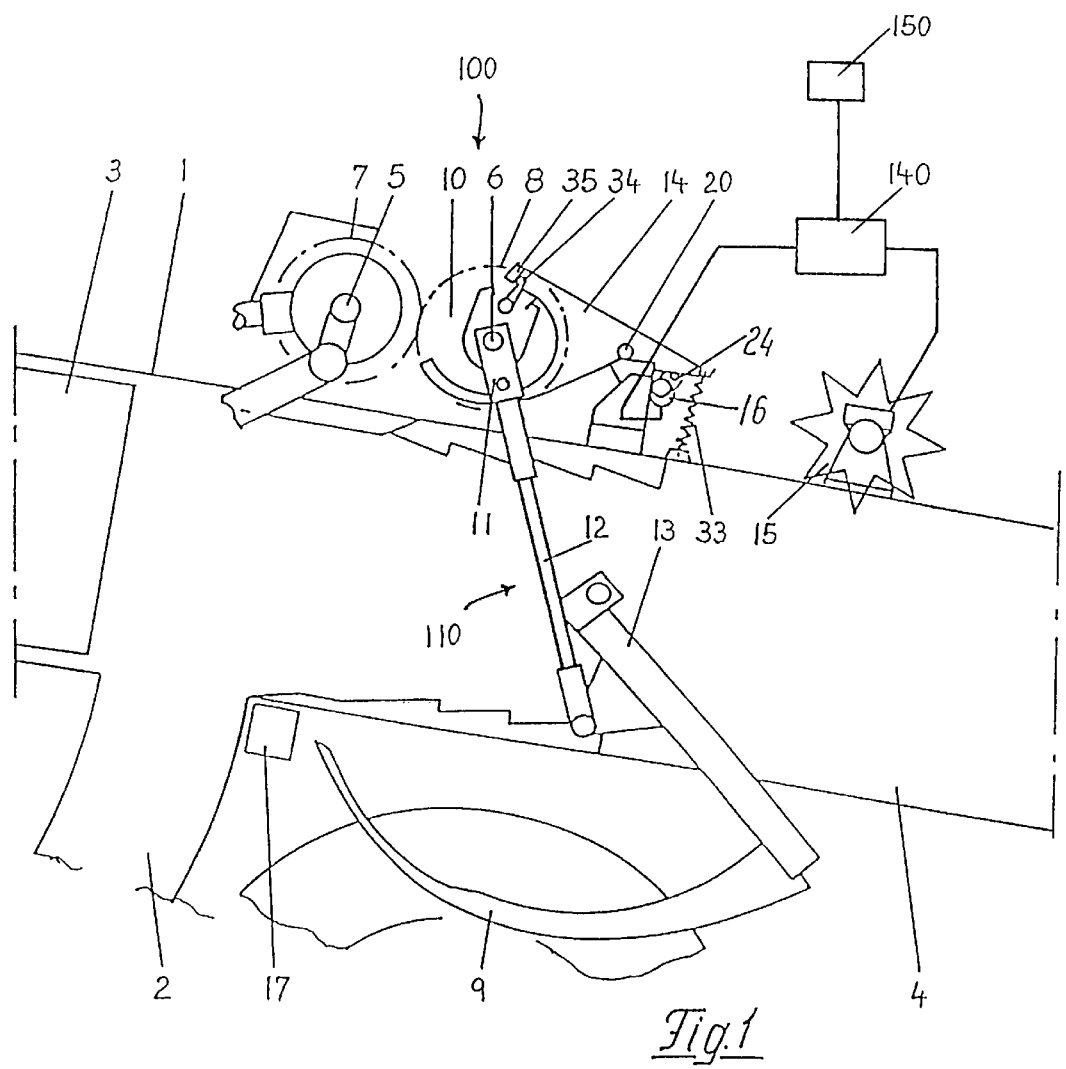
FIG. 1 is a side view of the bale chamber of a big square baler in the region of the twine wrap device.
Figure 2:
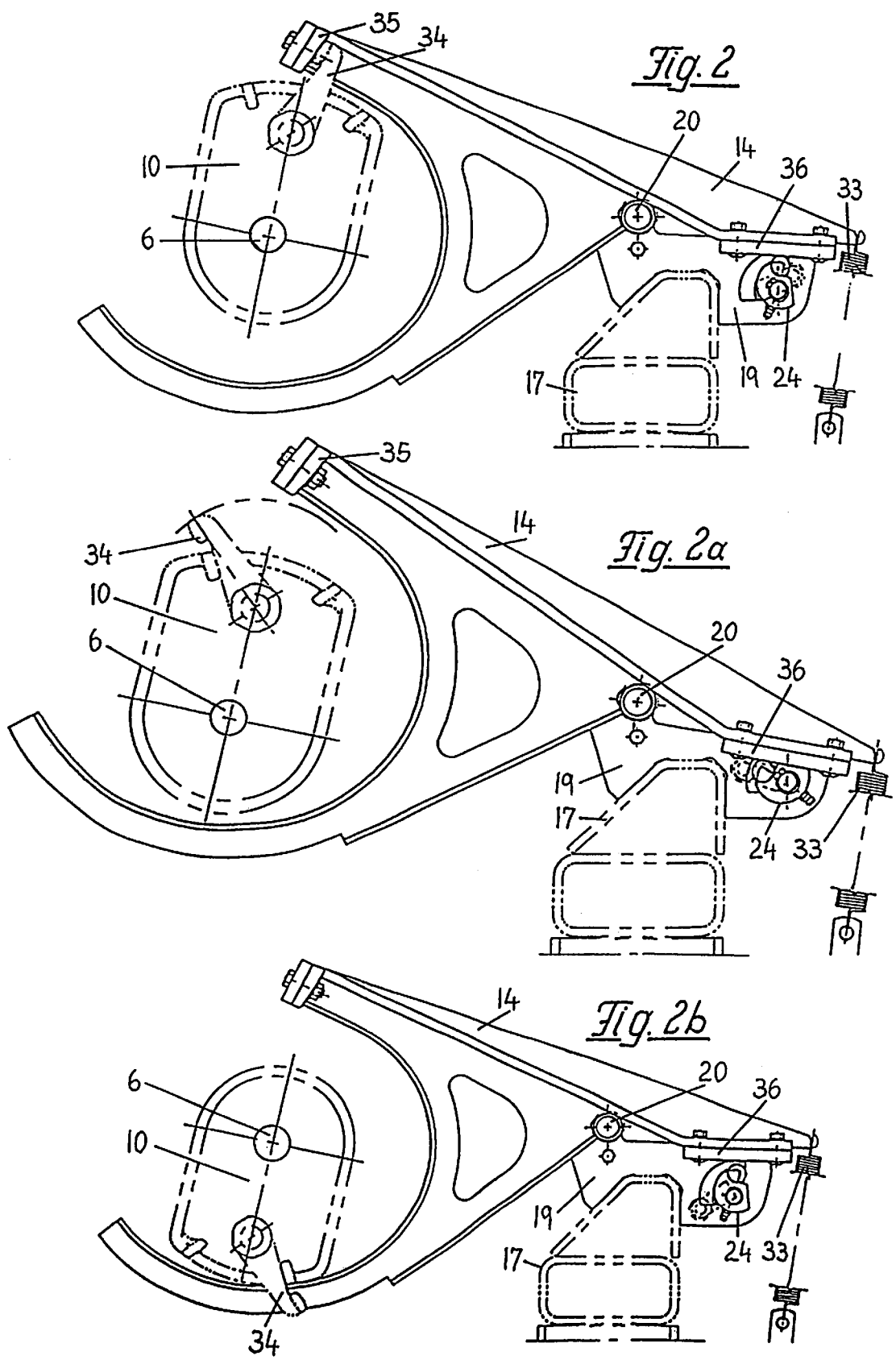
FIG. 2 is a side view of the actuating device for the clutch with the shift lever inside the orbit of the pawl (clutch disengaged).

As shown in FIG. 1, a device embodying the present invention is part of a big square baler 1 having a feed channel 2, a baling ram 3, a bale chamber 4 and a twine wrap device, shown at 100. Twine wrap device 100 includes spur gears 7 and 8, which are non-rotatably disposed on the intermediate drive shaft 5 and on a knotter shaft 6 respectively. The intermediate drive shaft 5 and knotter shaft 6 operate parallel to one another. The rotary movement of the intermediate drive shaft 5 is transmitted through the spur gears 7 and 8 to the knotter shaft 6. The knotter shaft 6 drives tying needles 9 through a drive transmission 110. The drive transmission 110 has a clutch 10, which may be of conventional design, and which is disposed on the knotter shaft 6, a crank 11, a drag link 12, and a rocker bar 13. A shift lever 14 actuates the clutch 10.

During the bale forming process, the drive to the tying needles 9 is interrupted by the clutch 10, as is known in the art. At this time, the tying needles 9 are located outside of the bale chamber 4. As soon as the pre-selected bale length is reached, the clutch 10 is actuated by the shift lever 14 thereby completing the drive connection between the knotter shaft 6 and the tying needles 9 and initiating the process of twine wrapping the bale. The length of the bale is determined via a rotatable star wheel 15 which is disposed above the bale chamber 4. The serrated circumference of the star wheel 15 is in contact with the surface of the bale. The star wheel 15 is connected to a conventional electronic counter 140. The electronic counter includes a switch connected to a power source 150 for electric motor 16. When the set bale length has been reached the electronic counter sends an electrical switching pulse providing power to electric motor 16 which actuates the control device 120 for the shift lever 14 of the clutch 10.

Figure 3:
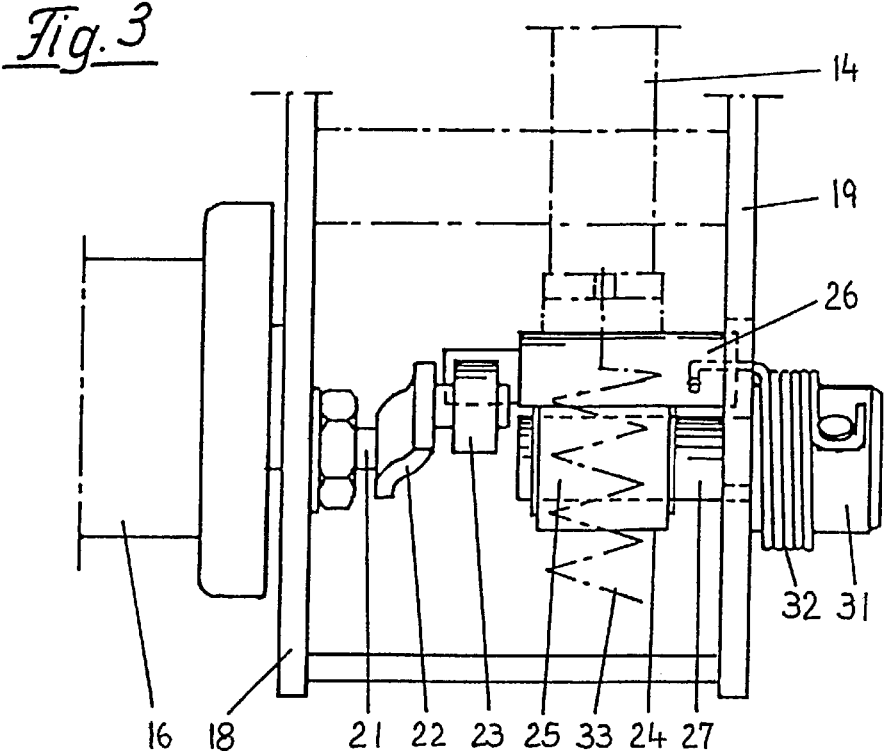
FIG. 3 is the control device for the shift lever according to view III of FIG. 5.
Figure 4:
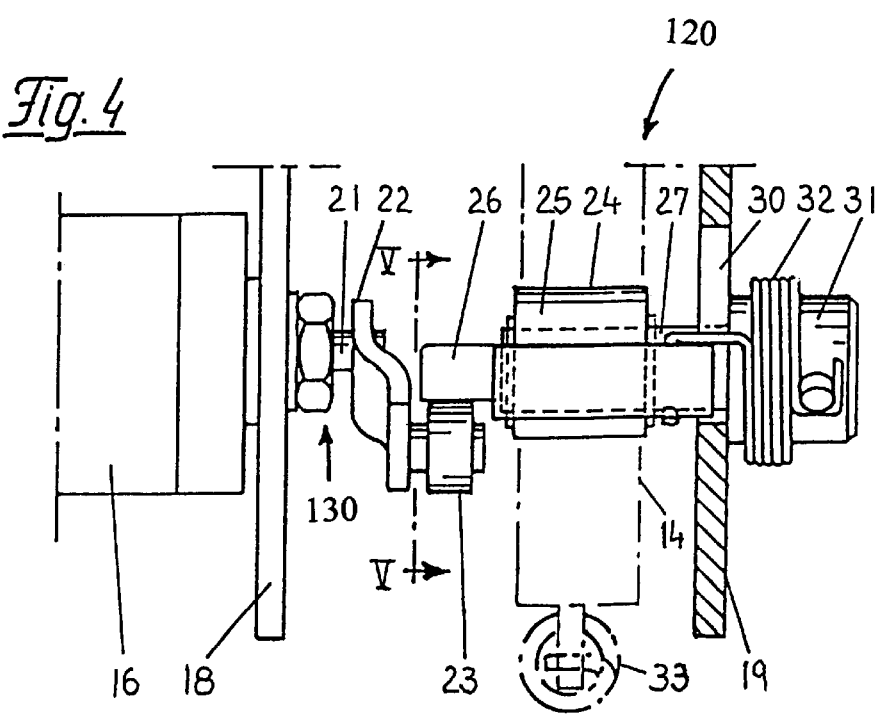
FIG. 4 is the control device for the shift lever according to view IV of FIG. 5.

Further details of the present invention are illustrated in FIGS. 2 through 6. As shown in FIGS. 3 and 4, a slow-running low power electric motor, such those for powering automobile windshield wipers, may be used as the electric motor 16. The electric motor 16 is secured to a bearing plate 18. The bearing plate is connected to the baler frame 17 and is oriented vertically in the lateral region beside the bearing of the shift lever 14. A support 19 is also securely connected to the baler frame 17 at a distance from the bearing plate 18 and parallel thereto. The shift lever 14 is pivotably mounted between the bearing plate 18 and the support 19 on an axle 20. The shift lever has a rest 35 at the end adjacent to the clutch 10 and a slide 36 located on a contact region of the shift lever 14 at the opposite end. A pawl 34, which can engage the rest 35 of the shift lever 14, is attached to the clutch 10. The control device 120 for the shift lever 14 is located between the support 19 and the bearing plate 18 and below the slide 36 which is located on the contact region of the shift lever 14. The control device 120 is connected in an axial direction to the electric motor 16 by a drive means 130. The drive means 130 is comprised of an output shaft 21 on the electric motor 16, an offset crank arm 22 attached to the output shaft 21, and a rotatable contact roller The control device 120 includes a cam 24 which has a cam shaped part 25, formed as shown, and a contact pin 26 securely connected thereto. The contact pin 26, which provides support for and controls the shift lever 14, is longer than the cam shaped part 25 and projects at both ends beyond the cam shaped part 25. At the end adjacent to the contact roller 23, the contact pin 26 has two molded surfaces 28 and 29, as shown. The cam shaped part 25 is provided with a stop surface 37 and a longitudinal bore to receive a support pin 27. The support pin 27 is non-rotatably disposed in the support 19. The cam 24 is supported by and pivotable around the support pin 27. The head end 31 of the support pin 27 is surrounded by a leg spring 32 which rests with one arm secured on the support pin 27 and with the other arm secured in a bore of the contact pin 26. The support 19 has a kidney-shaped recess 30 extending obliquely upwards and located adjacent to the contact pin 26. The adjacent end of the contact pin 26 protrudes into the recess 30.

OPERATION OF THE DEVICE

During the bale forming process, when the twine wrap device should be inactive, the action of the leg spring 32 tends to force the cam 24 into an upper position which brings the stop surface 37 of the cam shaped part 25 into contact with the slide 36 of the shift lever 14 and forces that end of the shift lever 14 upward. This action lowers the end of the shift lever 14 adjacent to the clutch 10. In this position, the rest 35 of the shift lever 14 is in the orbit of the pawl 34 on the clutch 10. When the pawl 34 strikes the rest 35, the clutch 10 is disengaged.

When the bale reaches the desired length and the twine wrap should be engaged, the electronic counter activates the electric motor 16. The electric motor 16 then revolves 360° and thereby actuates the control device 120 for the shift lever 14. The contact roller 23 is in contact with the contact pin 26 of the cam 24 and transfers to the cam 24 the movement of the crank arm 22. The contact roller 23 moves along the surface 28 of the contact pin 26 in order to force the cam 24 into a lower position in which the stop surface 37 of the cam shaped part 25 no longer pushes the slide 36 of the shift lever 14 upward. In this position, a tension spring 33 secured between the baler frame 17 and the contact region of the shift lever 14 pivots shift lever 14 around axle 20 and lowers the contact region of the shift lever 14, as shown in FIG. 2a, thereby raising the end of the shift lever 14 adjacent to the clutch 10 so that the rest 35 is no longer in the orbit of the pawl 34. This frees the pawl 34 to rotate, allowing the clutch 10 to engage. Surface 29 represents a further flattening of the contact pin 26 and allows the contact roller 23 to continue rotating behind the contact pin 26. The cam 24 is then free to return to its initial position under the force exerted by the leg spring 32 to reset cam 24. The shift lever 14 is forced back into its initial position which places the rest 35 in the orbit of the pawl 34 and clutch 10 is disengaged.

Other objects, features and advantages of the invention will be apparent to those skilled in the art. While a preferred embodiment of the present invention has been illustrated and described, this has been by way of illustration and the invention should not be limited, except as required by the scope of the appended claims and their equivalents.

We claim:

1. In a big square baler having a baler frame, a device for determining the bale length, and a twine wrap device operated by a clutch, a device for actuating the clutch of the twine wrap device comprising:

a pawl attached to the clutch of the twine wrap device;

a pivotably mounted shift lever which is pivotable into the orbit of the pawl and having a contact region which controls the shift lever's movement;

an electric motor;

an electric circuit which connects the electric motor and the device for determining the bale length;

a control device for the shift lever driven by the electric motor;

a cam which connects the control device with the contact region of the shift lever.

2. A device as set forth in claim 1, wherein the control device for the shift lever is disposed below the contact region of the shift lever.

3. A device a s set forth in claim 1, wherein the electric motor is comprised of a low power motor.

4. A device as set forth in claim 1, further comprising:

an output shaft having first and second ends and connected at the first end to the electric motor;

a crank arm having a shaft end and a free end and connected at the shaft end to the second end of the output shaft;

a rotatable contact roller connected to the free end of the crank arm.

5. A device as set forth in claim 4, wherein the contact roller is in contact with the cam.

6. A device as set forth in claim 1, wherein the cam is comprised of a formed part and a contact pin securely connected to the formed part and having first and second ends.

7. A device as set forth in claim 6, wherein the contact pin projects at both ends beyond the formed part.

8. A device as set forth in claim 6, wherein the first end of the contact pin has two molded contact surfaces.

9. A device as set forth in claim 6, further comprising:

a support fixed to the frame of the baler;

a support pin having cam and head ends and which is non-rotatably mounted at the head end in the support and on which the cam is pivotably mounted at the cam end.

10. A device as set forth in claim 9, wherein the support has a kidney-shaped recess extending obliquely upwards which is adjacent to the second end of the contact pin and into which is introduced the second end of the contact pin.

11. A device as set forth in claim 9, wherein the head end of the support pin is surrounded by a leg spring having first and second arms with the first arm being secured to the head end of the support pin and the second arm being secured to the second end of the contact pin.

12. A device as set forth in claim 1, further comprising a tension spring having first and second ends with the first end connected to the baler frame and the second end connected to the shift lever near the contact region of the shift lever.

13. A baler having a baler frame mounting a bale length determining device, a twine wrap device including a clutch and a clutch actuating device cooperating with the clutch, the clutch actuating device including:

a pawl attached to the clutch of the twine wrap device;

a pivotably mounted shift lever pivotable into contact with the pawl and cooperating with the pawl, the shift lever having a contact region which controls the shift lever's movement;

an electric motor;

an electrical connection between the electric motor and the bale length determining device;

a control device for the shift lever, the control device cooperating with the electric motor, and the control device including a cam connecting the control device with the contact region of the shift lever, whereby the shift lever is pivoted out of contact with the pawl to engage the clutch in response to a determined bale length.

14. A device as set forth in claim 13, further comprising:

an output shaft having first and second ends and connected at the first end to the electric motor;

a crank arm having a shaft end and a free end and connected at the shaft end to the second end of the output shaft;

a rotatable contact roller connected to the free end of the crank arm.

15. A device as set forth in claim 14, wherein the contact roller is in contact with the cam.

16. A device as set forth in claim 13, wherein the cam is comprised of a cam shaped part and a contact pin securely connected to the cam shaped part and having first and second ends.

17. A device as set forth in claim 16, wherein the contact pin projects at both ends beyond the cam shaped part.

18. A device as set forth in claim 16, wherein the first end of the contact pin has two molded contact surfaces.

19. A device as set forth in claim 16, further comprising:

a support fixed to the frame of the baler;

a support pin having cam and head ends and which is non-rotatably mounted at the head end in the support and on which the cam is pivotably mounted at the cam end.

20. A device as set forth in claim 19, wherein the support has a kidney-shaped recess extending obliquely upwards which is adjacent to the second end of the contact pin and into which is introduced the second end of the contact pin.

21. A device as set forth in claim 19, wherein the second end of the support pin is surrounded by a leg spring having first and second arms with the first arm being secured to the head end of the support pin and the second arm being secured to the second end of the contact pin.

22. A device as set forth in claim 13, further comprising a tension spring having first and second ends with the first end connected to the baler frame and the second end connected to the shift lever near the contact region of the shift lever.

23. A device as set forth in claim 13, wherein the control device for the shift lever is disposed below the contact region of the shift lever.

24. A twine wrap mechanism of a baler, the twine wrap mechanism having a pawl actuated clutch, a shift lever cooperating with the pawl to selectively engage and disengage the clutch, the shift lever being pivotable into and out of contact with the pawl, the clutch disengaging when the pawl is in contact with the shift lever and the clutch engaging when the pawl is out of contact by the shift lever, the mechanism including a controller for the shift lever, the controller including an electric motor and an electrical connector effective to cooperate with a bale length determining mechanism of a baler to provide current to the electric motor and initiate operation of the controller at a predetermined bale length, the controller further including a cam driven by the electric motor, the shift lever pivoting about a point at an intermediate location along its length, the pawl contacting the shift lever at a first end of the shift lever and the cam contacting the shift lever at a second end of the shift lever, the controller further including a crank on the output shaft of the electric motor, the crank engaging the cam and cooperating therewith, the shift lever being biased against the cam by a spring, the spring applying a force urging the shift lever out of contact with the pawl, the cam having a first position holding the shift lever in contact with the pawl and a second position in which the shift lever contact with the pawl is released, whereby the clutch may be selectively engaged in response to a bale length determining mechanism by selective movement of the cam from its first position to its second position by the electric motor and crank.

25. The device of claim 24 wherein the controller has a reset spring urging the cam to its first position.

* * * * *